US011366892B2

(12) United States Patent
Zhao et al.

(10) Patent No.: US 11,366,892 B2
(45) Date of Patent: Jun. 21, 2022

(54) DETECTING COMPROMISED CREDENTIALS BY IMPROVED PRIVATE SET INTERSECTION

(71) Applicant: Shape Security, Inc., Mountain View, CA (US)

(72) Inventors: Yao Zhao, Fremont, CA (US); Jian Jiang, Campbell, CA (US); Rundong Liu, Foster City, CA (US)

(73) Assignee: Shape Security, Inc., Santa Clara, CA (US)

(*) Notice: Subject to any disclaimer, the term of this patent is extended or adjusted under 35 U.S.C. 154(b) by 372 days.

(21) Appl. No.: 16/380,958

(22) Filed: Apr. 10, 2019

(65) Prior Publication Data
US 2020/0250296 A1      Aug. 6, 2020

Related U.S. Application Data

(60) Provisional application No. 62/801,643, filed on Feb. 5, 2019.

(51) Int. Cl.
| | |
|---|---|
| *G06F 21/45* | (2013.01) |
| *G06F 16/901* | (2019.01) |
| *G06F 21/62* | (2013.01) |
| *G06F 21/60* | (2013.01) |
| *G06F 21/56* | (2013.01) |
| *G06F 21/64* | (2013.01) |

(52) U.S. Cl.
CPC .......... *G06F 21/45* (2013.01); *G06F 16/9014* (2019.01); *G06F 21/566* (2013.01); *G06F 21/602* (2013.01); *G06F 21/6209* (2013.01); *G06F 21/64* (2013.01)

(58) Field of Classification Search
CPC ...... G06F 21/45; G06F 21/64; G06F 16/9014; G06F 21/6209; G06F 21/602; G06F 21/566; G06F 21/577
See application file for complete search history.

(56) References Cited

U.S. PATENT DOCUMENTS

| | | | |
|---|---|---|---|
| 10,051,001 B1* | 8/2018 | Ashley | H04L 63/14 |
| 2016/0261565 A1* | 9/2016 | Lorenz | H04L 9/0866 |
| 2017/0180412 A1* | 6/2017 | Mikulski | H04L 63/1433 |
| 2019/0007387 A1 | 1/2019 | Jin | |

(Continued)

OTHER PUBLICATIONS

PCT/US2018/040499, International Search Report, dated Nov. 9, 2018, Shape or.

*Primary Examiner* — Christopher A Revak
(74) *Attorney, Agent, or Firm* — Troutman Pepper Hamilton Sanders LLP (Rochester)

(57) ABSTRACT

In an embodiment, a method is configured to detect compromised credentials, comprising: generating a plurality of bloom filters, wherein each bloom filter corresponds to a particular subset of a set of compromised credentials; receiving an index value from a client computing device; in response to receiving the index value, determining a target bloom filter corresponding to the index value, and sending the target bloom filter to the client computing device; receiving a first value from the client computing device; in response to receiving the first value, generating a second value based on the first value, and sending the second value to the client computing device.

28 Claims, 4 Drawing Sheets

(56) References Cited

U.S. PATENT DOCUMENTS

| | | |
|---|---|---|
| 2019/0007428 A1 | 1/2019 | Moen |
| 2020/0279041 A1* | 9/2020 | Endler ................ G06F 21/6245 |
| 2021/0006573 A1* | 1/2021 | Britt ..................... G06F 21/602 |
| 2022/0027498 A1* | 1/2022 | Vandanapu ........... G06K 9/6256 |

* cited by examiner

DETECTING COMPROMISED CREDENTIALS BY IMPROVED PRIVATE SET INTERSECTION

BENEFIT CLAIM

This application claims the benefit under 35 U.S.C. § 119(e) of provisional application 62/801,643, filed Feb. 5, 2019, the entire contents of which is hereby incorporated by reference as if fully set forth herein.

FIELD OF THE INVENTION

The present disclosure relates generally to security of client/server computer systems, and more specifically, to computer-implemented techniques for detecting compromised credentials using private set intersection.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Billions of credentials (such as username and password combinations) have been leaked during data breaches. Leaked credentials may be used to gain unauthorized access to a user's account, and also may be used against other accounts owned by the user that share the same, or similar, credentials. Thus, it is desirable for a user to be able to easily check whether his credentials have been leaked.

Existing solutions allow a user to check whether a particular username or a particular password has been leaked or compromised. However, these solutions do not provide the ability to check a credential, that is, a particular combination of account username and password, against a set of leaked credentials.

Additionally, neither the service provider nor the user can be sure that the other party is legitimate. As such, the user does not want to provide his credentials to the service provider, whether directly or hashed. Similarly, the service provider does not want to allow users to access the set of leaked credentials or infer any information regarding the set of leaked credentials, outside of checking whether their own credentials have been compromised.

For example, one technique may include sending a user a set of secure hashes of passwords that correspond to a particular username. Even though the user is unable to reverse the secure hashes to reveal the passwords, the user can determine how many compromised passwords are associated with the particular username.

Furthermore, even though the service provider may have obtained the set of leaked credentials from public sources (e.g. a black marketplace), the service provider would want to avoid leaking the set of leaked credentials it has obtained in the event it is breached.

Thus, secure and efficient techniques for checking compromised credentials are desired.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs, and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are disclosed in sections according to the following outline:
 1. General Overview
 2. Overview of Example Embodiments
 3. Process Overview
 3.1 Generating Bloom Filters
 3.2 Checking Credentials
 4. Implementation Example—Hardware Overview
 5. Other Aspects of the Disclosure

1. General Overview

Computer-implemented techniques are provided for determining whether a credential has been compromised. In an embodiment, at a server computer, one or more bloom filters may be generated, wherein each bloom filter corresponds to a particular subset of a set of compromised credentials. Each compromised credential of the set of compromised credentials may be inserted into the corresponding bloom filter. Additionally, one or more public-private key pairs and/or one or more salt values may be generated, wherein each public-private key pair and/or salt value corresponds to a particular subset of the set of compromised credentials.

In an embodiment, at the server computer, in response to receiving an index value from a client computing device, a target bloom filter corresponding to the index value may be determined and sent to the client computing device. Additionally, a public key and/or salt value corresponding to the index value may be determined and sent to the client computing device.

In an embodiment, at the server computer, in response to receiving a first value from a client computing device, a second value may be generated based on the first value and sent to the client computing device.

In an embodiment, at a client computing device, a credential comprising a username and a password may be received. An index value associated with the credential may be determined and sent to a server computer. In response, a bloom filter may be received from the server computer. Additionally, a public key and/or salt value may be received from the server computer.

In an embodiment, at the client computing device, a first value based on the credential may be generated and sent the first value to the server computer. In response, a second value may be received from the server computer.

In an embodiment, at the client computing device, based on the second value, whether the credential corresponds to an entry in a bloom filter is determined. Based on determining whether the credential corresponds to an entry in the bloom filter, whether the credential has been compromised may be determined.

2. Overview of Example Embodiments

Figure 1:
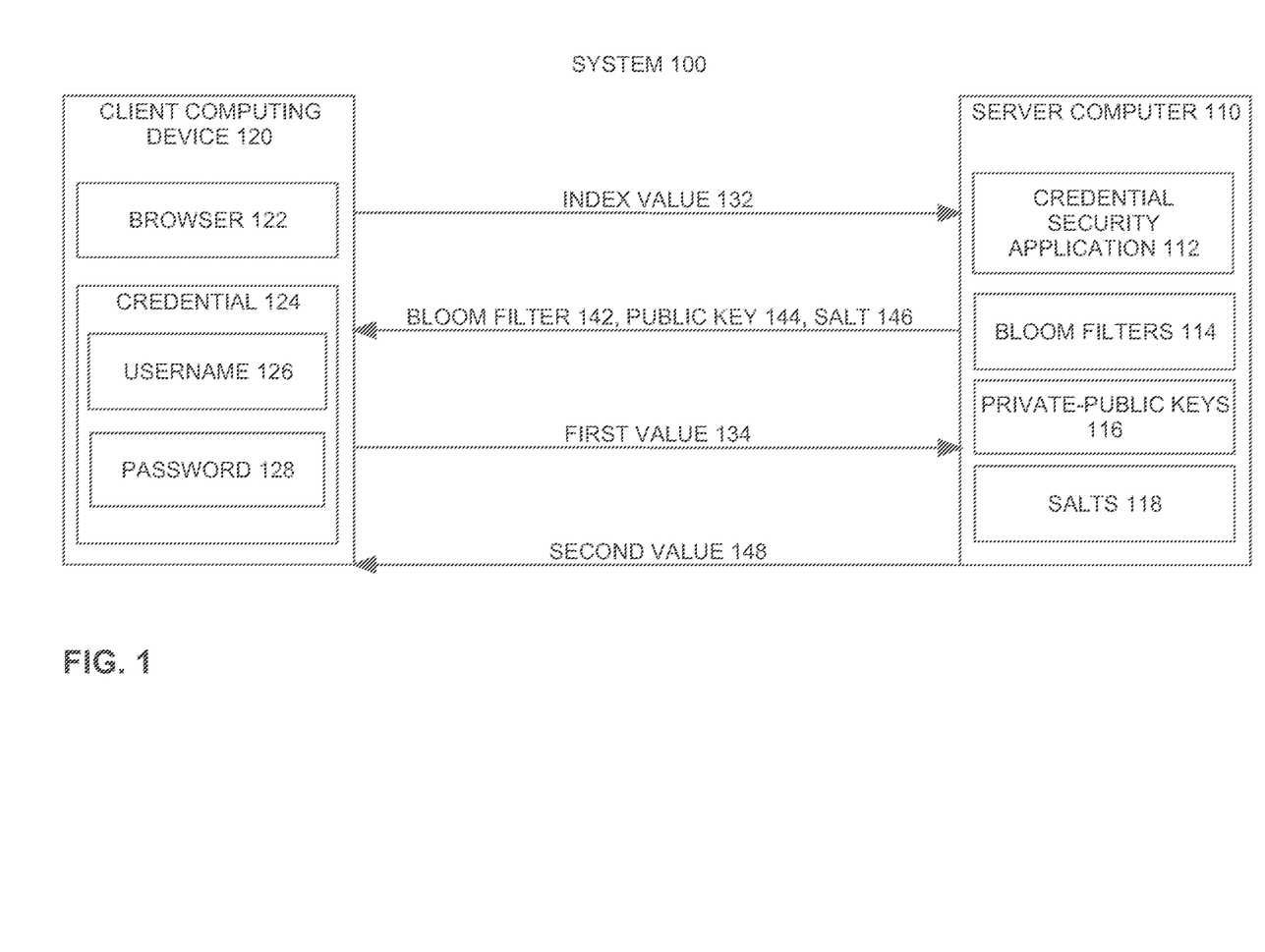
FIG. 1 illustrates an example computer system in which the techniques described may be practiced, according to one embodiment.

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

In FIG. 1, system 100 comprises server computer 110 and client computing device 120. Server computer 110 and client computing device 120 may be interconnected to one another using any suitable data communication mechanism such as one or more data networks. The one or more data networks may include one or more local area networks (LANs), one or more wide area networks (WANs), one or more internetworks such as the public Internet, or a company network.

Client computing device 120 may be any computing device, including but not limited to: servers, racks, work stations, personal computers, general purpose computers, laptops, Internet appliances, wireless devices, wired devices, multi-processor systems, mini-computers, and the like. Client computing device 102 also includes other hardware elements, such as one or more input devices, memory, processors, and the like, which are not depicted in FIG. 1. Client computing device 102 also includes applications, software, and other executable instructions to facilitate various aspects of embodiments described herein. Although a single client computing device is depicted in FIG. 1, any number of client computing devices may be present. Each client computing device 102 may send and receive data from server computer 110.

Client computing device 120 may send data to and receive data from server computer 110 for determining whether particular credentials have been compromised or leaked. For example, assume client computing device 120 receives a credential 124 comprising a username 126 and a password 128. Client computing device 120 may send an index value 132 and receive bloom filter 142, public key 144, and salt 146. Client computing device 120 may calculate a first value 134 based on credential 124, public key 144, and salt 146, send the first value 134 to server computer 110, and receive second value 148. As discussed in further detail below, determining whether credential 124 has been compromised may comprises determining whether the second value 148 corresponds to an entry in bloom filter 142.

Client computing device 120 may execute software, applications, or other program instructions for interacting with server computer 110. The software, applications, and/or other program instructions may be programmed or configured to send and receive data from server computer 110 for detecting compromised credentials, and determine, based on the received data, whether a particular username and password pair has been compromised. In the illustrated example, client computing device 120 is executing a browser 122. Browser 122 may be programmed or configured, or execute instructions that are programmed or configured, to interact with server computer 110, such as a webpage, browser plug-in, web application, etc.

Server computer 110 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 110 broadly represents one or multiple server computers, such as a server cluster, and the server computer may be located in one or more physical locations. Server computer 110 also may represent one or more virtual computing instances that execute using one or more computers in a datacenter such as a virtual server farm.

Server computer 110 may send data to and receive data from client computing device 120 for determining whether particular credentials have been compromised or leaked. For example, server computer 110 may generate one or more bloom filters 114, and one or more private-public key pairs 116, one or more salts 118. Server computer 110 may insert each credential of a set of compromised credentials into a particular bloom filter 114 based on a respective private-public key pair 116 and a respective salt 118 corresponding to the particular bloom filter 114.

Additionally, server computer 110 may receive an index value 132 from client computing device 120, determine a bloom filter, public key, and/or salt corresponding to the index value 132, such as bloom filter 142, public key 144, and salt 146, and send them to client computing device 120. Server computer 110 may receive the first value 134, generate a second value 148 based on the first value 134, and send the second value 148 to client computing device 120.

In FIG. 1, server computer 110 is executing credential security application 112. In an embodiment, credential security application 112 comprises program instructions that are programmed or configured to perform one or more of the functions described above for detecting compromised credentials, for example, receive a set of compromised credentials, generate one or more bloom filters corresponding to the set of compromised credentials, and insert each credential of the set of compromised credentials into a bloom filter of the one or more bloom filters.

In an embodiment, credential security application 112 may be programmed or configured to receive a request from a client computing device, determine a particular bloom filter of the one or more bloom filters that corresponds to the request, send the particular bloom filter to the client computing device. Additionally, credential security application 112 may be programmed or configured to receive a first value corresponding to a particular username and password pair, generate a second value based on the first value, and send the second value to the client computing device.

In an embodiment, the credential security application 112 provides an API that may be accessed, for example, by an application executing on client computing device 120 to send data to and receive data from credential security application 112 for detecting compromised credentials.

3. Process Overview

Figure 2:
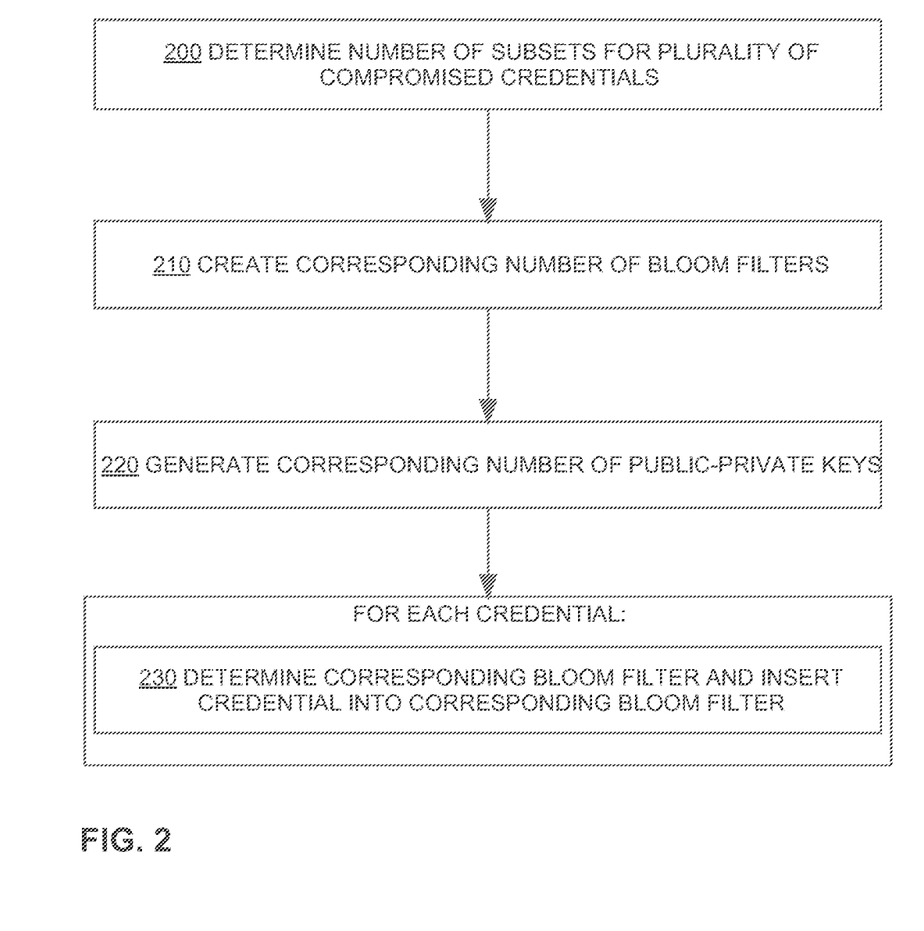
FIG. 2 illustrates example steps generating a set of bloom filters, according to an embodiment.
Figure 3:
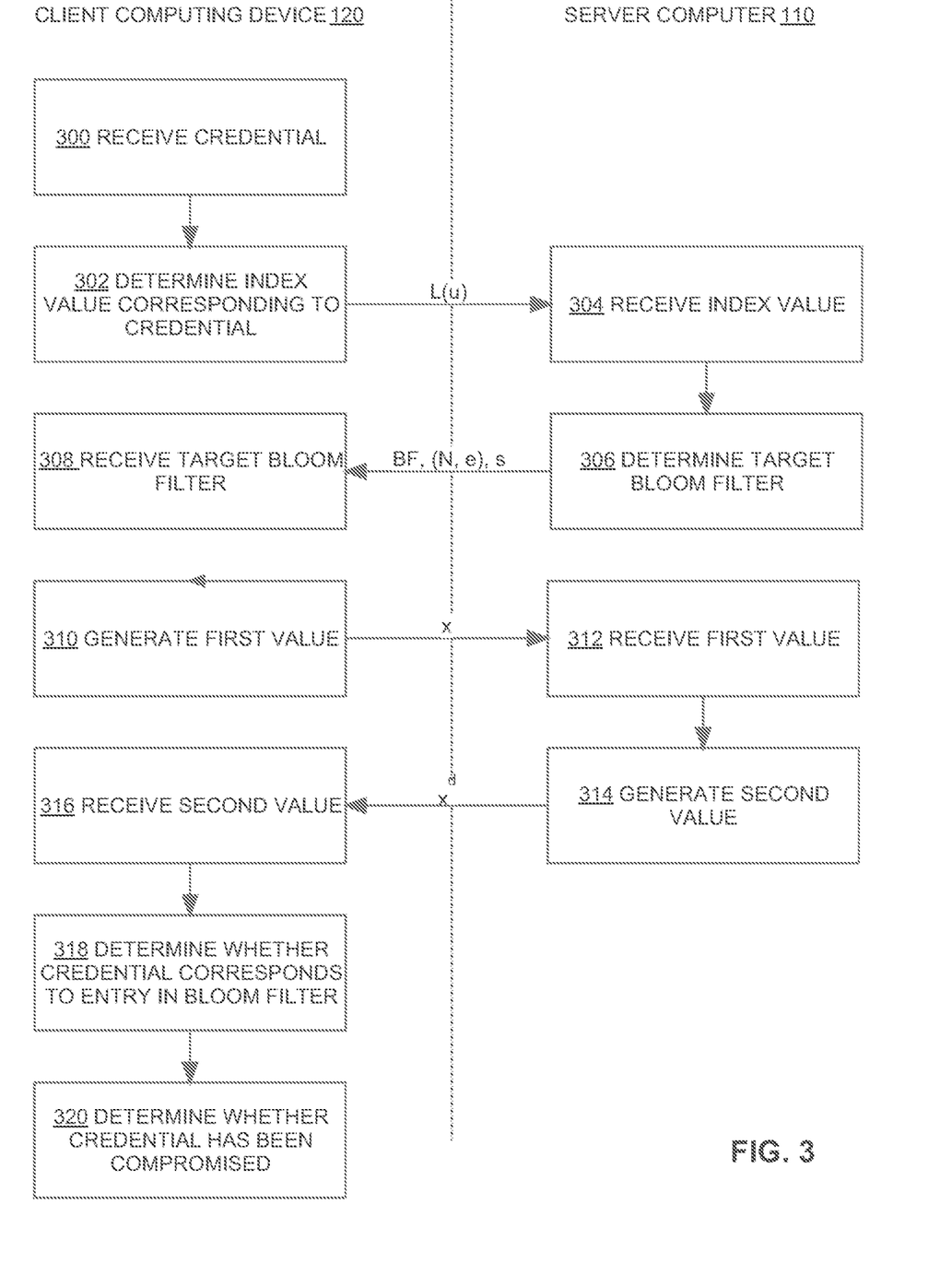
FIG. 3 illustrates example steps for determining whether a credential is compromised, according to an embodiment.

FIG. 2 illustrates example steps for generating a set of one or more bloom filters based on a set of compromised credentials, in an example embodiment. FIG. 3 illustrates example steps for determining whether a particular credential is compromised or likely to have been compromised.

Although the steps in FIG. 2 and FIG. 3 described below are shown in an order, the steps of FIG. 2 and FIG. 3 may be performed in any order, and are not limited to the order shown in the figures. Additionally, some steps may be optional, may be performed multiple times, and/or may be performed by different components. All steps, operations, and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

3.1 Generating Bloom Filters

FIG. 2 illustrates example steps for generating a set of one or more bloom filters based on a set of compromised credentials, in an example embodiment. Each compromised credential in the set of compromised credential may comprise a username and a password. The set of compromised credentials may be received or retrieved from any number of sources, depending on the embodiment. Example sources include data storage devices or memory connected to or accessible by server computer 110, third-party server computers, cloud-based storage systems, and the like.

In an embodiment, in response to detecting an attack, each credential used in the attack is provided to the server computer 110. The credentials may be hashed prior to being sent to server computer 110. Additionally or alternatively, in response to a data breach, credentials that were used in the breach may be provided to server computer 110. The credentials may be provided by a party whose data was breached, or may be obtained from, for example, a published list of credentials or a black market purchase.

In step 200, a number of subsets is determined for a set of compromised credentials. The set of compromised credentials is divided into one or more subsets. If the set of compromised credentials is small, a single bloom filter may be sufficient to contain all of the compromised credentials. However, a set of compromised credentials might contain billions of credentials. Rather than inserting all of the credentials into a single bloom filter, the compromised credentials are divided or sharded into a plurality of subsets. The number of subsets may vary depending on the number of compromised credentials and/or the particular implementation.

To illustrate a clear example, assume a credential set comprises 4 billion ($2^{32}$) credentials that are divided into $2^{24}$ subsets. Each subset would contain an average of 256 credentials, which if sent to a client computer, would be significantly less data than the full 4 billion credentials set. Not only does this reduce the amount of data sent across a network, but also increases computational efficiency by reducing the number of credentials that would need to be searched or compared in order to determine whether a particular credential is in the subset.

In step 210, one or more bloom filters corresponding to the one or more subsets are created or initialized. Referring to the above example, $2^{24}$ bloom filters are initialized. Each bloom filter corresponds to a particular subset of compromised credentials.

A bloom filter is a type of data structure that is used to determine whether an element is a member of a set. Each bloom filter may be created programmatically in memory by allocating an array of bits, where each bit is initialized to 0. The number of bits in the array may vary depending on the number of elements in each subset of compromised credentials and a threshold percentage of false positives.

In step 220, for each subset, a corresponding public-private key pair is generated. Referring to the above example, $2^{24}$ public-private key pairs are created. Each public-private key pair also corresponds to a particular subset of compromised credentials. Public-private key pairs may comprise digitally stored values in memory.

In an embodiment, the public-private key pairs are RSA keys. Each RSA key may be represented as $(N_i, e, d_i)$, where i indicates the i-th subset of compromised credentials, $(N_i, e)$ represents the RSA public key, and $(N_i, d_i)$ represents the RSA private key for the i-th subset of compromised credentials.

Each subset therefore corresponds to a particular bloom filter and a particular public-private key pair. As an example, a first subset may correspond to a bloom filter $BF_1$ and a public-private key pair $(N_1, e, d_1)$; a second subset may correspond to a bloom filter $BF_2$ and a public-private key pair $(N_2, e, d_2)$; and so on.

Additionally, for each subset, a corresponding salt, or random value, may be generated. Referring to the previous example, the first subset may correspond to a first randomly generated salt $s_1$ and the second subset may correspond to a second randomly generated salt $s_2$.

In step 230, for each credential in the set of compromised credentials, the corresponding subset is determined from the one or more subsets, and the credential is inserted into the bloom filter corresponding to the subset.

In an embodiment, a lossy hash function is used to determine which subset a particular credential is added to. An example lossy hash function may be:

$$L(x) = \text{first } c \text{ bits of SHA-256}(x)$$

A SHA-256 cryptographic hash is applied to x, which produces a 256-bit result. The lossy hash function $L(x)$ takes only the first c bits of the result as its value.

Referring to the above example, assume c is 24. The SHA-256 cryptographic hash may be applied to the username of the particular credential to produce a 256-bit value. The first 24 bits of the SHA-256 result may be used as an index value to determine the corresponding subset and bloom filter for the particular credential.

As an example, assume the output of the lossy hash function is 3. The particular credential would correspond to subset 3, and the corresponding bloom filter would be $BF_3$.

Similarly, the corresponding public-private key pair may be $(N_3, e, d_3)$, and a corresponding salt value may be $s_3$.

In an embodiment, each credential is transformed before being inserted into the corresponding bloom filter. Transforming the credential may comprise encrypting and/or hashing the credential. A hash function may be applied to the credential to generate a transformed value. Additionally, a salt value corresponding to the subset may be combined with the credential before applying the hash function. Using a salt value increases the security of the hashed credential, and makes it more difficult for someone to determine the values contained in the credential. An example hash function may be:

$$x = H(u, p, s_i)$$

where x represents the transformed credential, u is the username of the credential, p is the password of the credential, $s_i$ is the salt corresponding to the particular subset, and H is a hash function. The transformed value x is inserted into the i-th bloom filter.

Additionally, the output of the hash function H may be encrypted using the private key from the corresponding public-private key pair. An example encrypted hash function may be:

$$x = (H(u, p, s_i))^{d\_i}$$

where d_i represents the private key corresponding to the i-th subset.

In an embodiment, inserting the credential into the corresponding bloom filter comprises setting one or more bits corresponding to the credential to 1. For example, after computing the transformed value x, the bit array at the index of x may be set to 1.

The sets of populated bloom filters, public-private key pairs, and salt values may be stored at server computer 110 or in a storage device accessible by server computer 110. As discussed in further detail below, the bloom filters, public-private key pairs, and salt values are used when determining whether a particular credential has been compromised.

3.2 Checking Credentials

FIG. 3 illustrates example steps for determining whether a particular credential is compromised or likely to have been compromised.

In step 300, a client computing device receives a credential comprising a username and a password. The credential may be received via user input, for example through a graphical user interface of an application, or entered through a web page or plug-in in a browser. Additionally or alternatively, the credential may be received as it is being used. For example, a browser plug-in may detect when a user utilizes the credential to login to a website. For the purpose of illustrating a clear example, assume a user at client computing device 120 has a credential comprising a username u and a password x, and wants to check if the combination of u and x has been leaked.

In step 302, the client computer determines an index value corresponding to the credential, and sends the index value to the server computer. In an embodiment, determining the index value is the same as determining the subset to which a credential belongs. For example, as discussed above, a lossy hash function may used to determine which subset a particular credential is added to. The lossy hash function may be applied to the username of the credential to determine the index value corresponding to the credential. An example lossy hash function for determining the index value may be:

$$i = \text{first } c \text{ bits of SHA-256 (username)}$$

A SHA-256 cryptographic hash is applied to the username of the credential, which produces a 256-bit result. The index value i is the first c bits of the result.

Referring to the above example, assume the lossy hash function is applied to username u, resulting in an index value of k. Client computing device 120 sends the value k to the server computer 110.

In step 304, a server computer receives an index value from a client computing device. For example, server computer 110 may receive a request from client computing device 120 specifying the index value k.

In response to receiving the index value, at step 306, the server computer determines a target bloom filter corresponding to the index value and sends the target bloom filter to the client computing device. In an embodiment, the index value corresponds to the index of a particular subset of compromised credentials, which then corresponds to a particular bloom filter of the plurality of bloom filters. The index value may be used to determine the particular subset of compromised credentials corresponding to the index value. Then, the corresponding bloom filter is determined based on the particular subset of compromised credentials. Additionally or alternately, the index value may be used to retrieve the particular bloom filter. For example, the plurality of bloom filters may be stored as a set, and the index value may be used to index the set to retrieve the particular bloom filter.

Additionally, a particular public-private key pair corresponding to the index value may be determined. The public key of the particular public-private key pair may be sent to the client computing device. The public key may be sent as part of sending the particular bloom filter. Alternately, the public key may be sent separately from the particular bloom filter.

As discussed above, each subset of compromised credentials may correspond to a particular public-private key pair. The index value corresponds to the index of a particular subset of compromised credentials, which corresponds to a particular public-private key pair of a plurality of public-private key pairs. The index value may be used to determine the particular subset of compromised credentials corresponding to the index value. Then, the corresponding public-private key pair is determined based on the particular subset of compromised credentials. Additionally or alternately, the index value may be used to retrieve the particular public-private key pair. For example, the plurality of public-private key pairs may be stored as a set, and the index value may be used to index the set to retrieve the particular public-private key pair.

Additionally, a particular salt value corresponding to the index value may be determined. The particular salt value may be sent to the client computing device. The salt value may be sent as part of sending the particular bloom filter and/or the public key. Alternately, the salt value may be sent separately from the particular bloom filter and/or the public key.

As discussed above, each subset of compromised credentials may correspond to a particular salt value. The index value corresponds to the index of a particular subset of compromised credentials, which corresponds to a particular salt value of a plurality of salt values. The index value may be used to determine the particular subset of compromised credentials corresponding to the index value. Then, the corresponding salt value is determined based on the particular subset of compromised credentials. Additionally or alternately, the index value may be used to retrieve the particular salt value. For example, the plurality of salt values may be stored as a set, and the index value may be used to index the set to retrieve the particular salt value.

Referring to the above example, client computing device 120 may determine that index value k corresponds to the k-th subset of compromised credentials. In response, client computing device 120 retrieves bloom filter $BF_k$, public-private key pair $(N_k, e, d_k)$, and salt $s_k$. Client computing device 120 sends the bloom filter $BF_k$, public key $(N_k, e)$, and salt $s_k$ to server computer 110.

At step 308, the client computing device receives a bloom filter from the server computer. Additionally, the client computing device may receive a public key and/or salt value. Referring to the above example, client computing device 120 receives the bloom filter $BF_k$, public key $(N_k, e)$, and salt $s_k$ from server computer 110.

At step 310, the client computing device generates a first value based on the credential and sends the first value to the server computer. In an embodiment, generating the first value comprises applying a hash function to the credential. Additionally, the salt value received from the server computer may be combined with the credential before applying the hash function. An example hash function may be:

$$x=H(u,p,s)$$

where x is the first value, u is the username, p is the password, s is the salt value received from the server computer, and H is a hash function.

Additionally, the client computing device may generate a secret key. Generating the first value may be based on the secret key. An example function for generating the first value may be:

$$x=H(u,p,s)\cdot r$$

where x is the first value, u is the username, p is the password, s is the salt value received from the server computer, H is a hash function, and r is the secret key. In addition, the secret key may be encrypted using the public key received from the server computer. An example function for generating the first value where the secret key is encrypted may be:

$$x=H(u,p,s)\cdot r^e \pmod{N}$$

where (N, e) is the public key received from the server computer.

Referring to the above example, client computing device 120 may generate a secret key $r_k$ and calculate a first value x, using $x=H(u, p, s_k)\cdot r^e \pmod{N_k}$. Client computing device 120 may send x to the server computer 110.

In step 312, the server computer receives the first value from the client computing device. Referring to the above example, server computer 110 receives x from client computing device 120.

In step 314, the server computer generates a second value based on the first value received from the client computing device, and sends the second value to the client computing device. In an embodiment, generating the second value comprises encrypting the first value using the private key corresponding to the index value received at step 304. Referring to the above example, the public-private key pair corresponding to index k was $(N_k, e, d_k)$. Server computer 110 may encrypt the first value using private key $(N_k, d_k)$ to generate the second value. That is, the second value may be represented as:

$$x_2=x^d$$

which may also be represented as:

$$x_2=H(u,p,s_k)^d \cdot r^{ed}$$

where $x_2$ is the second value, (N, d) is the private key corresponding to the index value, and "$H(u, p, s_k)\cdot r^e$" is the first value that was received from the client computing device in step 312. Server computer 110 sends $x_2$ to client computing device 120.

In step 316, the client computing device receives the second value from the server computer. Referring to the above example, client computing device 120 receives $x_2$ from server computer 110.

In step 318, the client computing device determines, based on the second value, whether the credential corresponds to an entry in the bloom filter received from the server computer. In an embodiment, the credential corresponds to an entry in the bloom filter if the second value is in the bloom filter. Alternately, if the first value was generated based on a secret key, the secret key is removed prior to checking whether the second value is in the bloom filter.

As an example, assume the second value received is:

$$x_2=H(u,p,s_k)^d \cdot r^{ed}$$

In the above example, $r^{ed}$ would result in the value r. That is, r is first encrypted using the public key when generating the first value, and applying the private key when generating the second value would decrypt r. In other words:

$$x_2=H(u,p,s_k)^d \cdot r$$

To remove the secret key r, the second value is multiplied by the inverse of r, $r^{-1}$. This may be represented as:

$$y=x_2 \cdot r^{-1}=H(u,p,s_k)^d \cdot r \cdot r^{-1}$$

where y is the output generated by removing the secret key r from the second value. This results in:

$$y=H(u,p,s_k)^d$$

The client computing device then checks whether y is in the bloom filter $BF_k$ or not. In an embodiment, determining whether a value is in the bloom filter comprises determining whether one or more bits corresponding to the value has been set. If each of the one or more corresponding bits have been set to 1, then the value is in the bloom filter. If at least one of the corresponding bits is set to 0, then the value is not in the bloom filter. As an example, determining whether y is in the bloom filter may comprise determining whether the bit at index y in the bit array is set to 0 or 1.

Alternately, if the server computer did not encrypt the hashed credentials prior to inserting them into a bloom filter, then the steps of sending the first value to the server computer, receiving the first value from the client computing device, and generating and sending a second value do not need to be performed. Generating the second value transforms the first value into an intermediate format similar to the credentials that are inserted into the bloom filter. For example, as discussed above, a credential may be transformed based on the function $x=(H(u, p, s_i))^{d_i}$ for insertion into the i-th bloom filter. If the credential is inserted into the bloom filter without encryption, then the client computing device is able to generate a transformed credential value, e.g. $H(u, p)$ or $H(u, p, s)$, without the server computer. The client computing device may generate the first value and proceed to step 318 to determine whether the first value corresponds to an entry in the bloom filter.

In step 320, the client computing device determines, based on whether the credential corresponds to an entry in the bloom filter, whether the credential is compromised or likely to have been compromised. In an embodiment, if the credential corresponds to an entry in the bloom filter, then it is likely that the credential has been compromised. If the credential does not correspond to an entry in the bloom filter, then it is unlikely that the credential has been compromised.

In some instances, two different username and password combinations may result in the same hashed values. For example, assume $(H(u, p, s_i))^d$ is used to insert a username and password into a bloom filter, and $u_1$ and $p_1$ are the username and password for a first credential, and $u_2$ and $p_2$ are the username and password for a second credential. If $H(u_1, p_1, s_i)^d$ and $H(u_2, p_2, s_i)^d$ set the same bits in the bloom filter, and if the first credential is in the bloom filter, then checking the second credential, $u_2$ and $p_2$, would indicate that the second credential corresponds to an entry in the bloom filter when it is not in the bloom filter. Thus, in these instances, it is possible that a match is found in the bloom filter, even though the credential may not have been compromised, i.e. result in a false positive. As such, a matching entry in the bloom filter may indicate that it is likely that a credential has been compromised.

However, a bloom filter may not produce false negatives, i.e. indicating no matching entries when the credential is in the bloom filter. Thus, if a matching entry is not found in the bloom filter, then the credential has not been compromised.

In an embodiment, an indication is generated indicating whether the credential is likely to have been compromised. For example, a user may enter a credential into a form in browser 122 to check whether the credential has been compromised. If the credential is determined to have likely been compromised, then browser 122 may display a notification, web page, or other indication to the user that the credential entered by the user has likely been compromised.

In an embodiment, the techniques described above may be used to determine whether a plurality of credentials have been compromised, or likely to have been compromised. Each of steps 300-320 may be performed for each credential of the plurality of credentials, either separately or in parallel. In this way, embodiments integrate the functions that have been described herein into the practical applications of improving computer security and/or computer access control. By using computers and/or computer-implemented techniques for detecting compromised credentials in those systems, compromised credentials can be rejected and access to the computer systems can be blocked selectively, thereby protecting data from disclosure and/or protecting the computer systems from the introduction of malware or malicious programs.

For example, client computing device 120 receives a plurality of credentials. For each credential, client computing device 120 determines a corresponding index value. Client computing device 120 may send a plurality of index values to server computer 110. For each index value of the plurality of index values, server computer 110 determines the corresponding bloom filter, public key, and salt value, and sends them to client computing device 120.

Additionally, if two or more credentials correspond to the same index value, client computing device 120 may include the index value only once when sending the plurality of index values. Alternately, if server computer 110 determines the same bloom filter corresponds to two or more index values sent by client computing device 120, then server computer 110 may include the bloom filter only once when sending a plurality of bloom filters to client computing device 120.

Similarly, client computing device 120 may calculate a first value for each credential, and send a plurality of first values to the server computer 110. Server computer 110 may generate a plurality of second values based on the plurality of first values. Client computing device 120 may check whether each credential corresponds to an entry in a corresponding bloom filter based on a corresponding second value.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
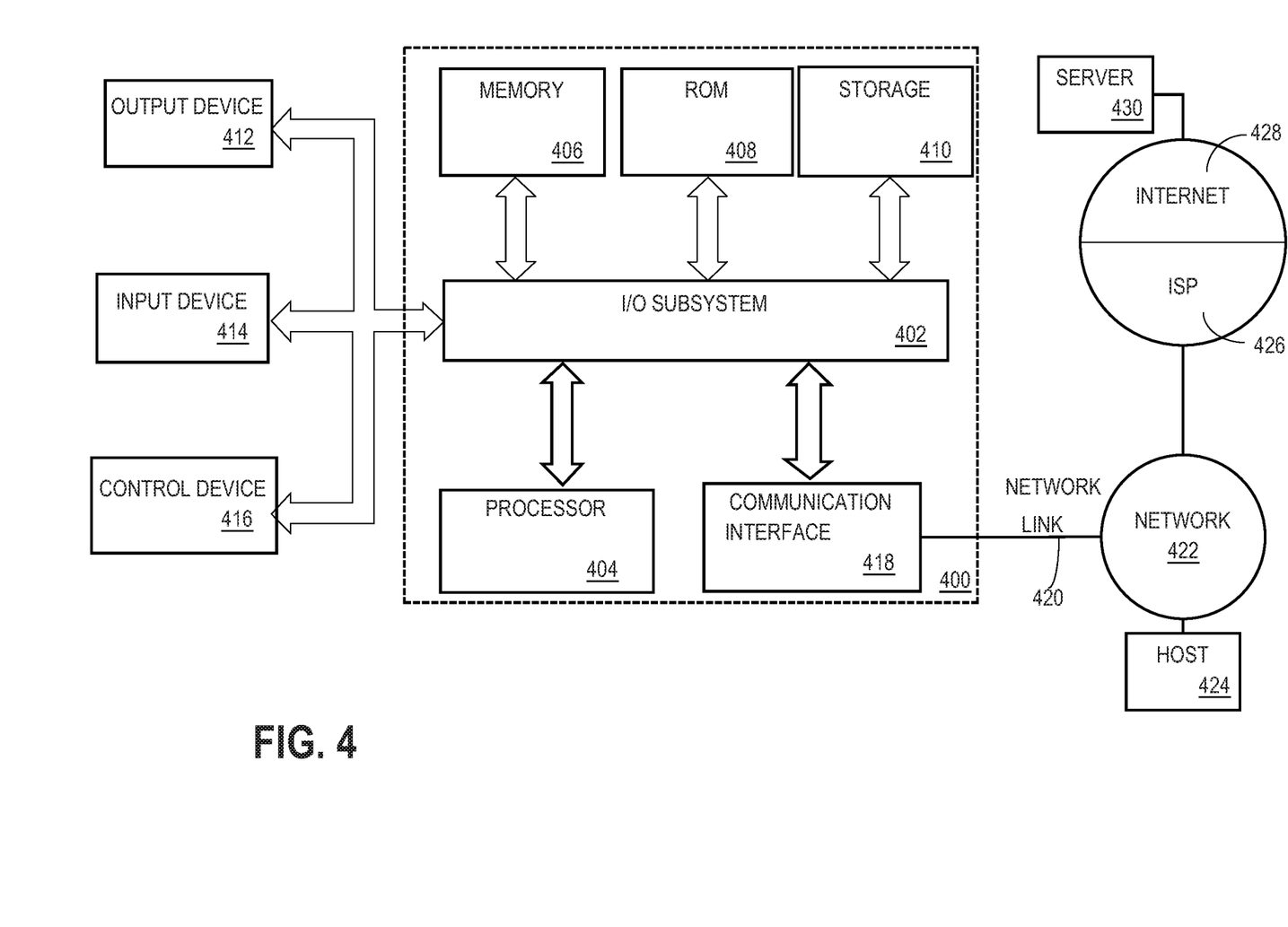
FIG. 4 is a block diagram that illustrates a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Other Aspects of the Disclosure

Using the techniques described herein, a user may efficiently check whether a particular credential has been compromised. The use of bloom filters reduces the amount of data that needs to be transferred across a network, and allows a client computer to quickly determine whether an entry is in a set of compromised credentials, i.e. in a particular bloom filter, without revealing information such as the other credentials contained in the bloom filter or the number of credentials that are possible matches. Additionally, the server computer is unable to decipher the user's credential based on the values sent to the server computer, e.g. the index value and the first value.

A further benefit is that after a compromised credential is inserted into a bloom filter, the compromised credential is no longer needed by the server computer. The compromised credential may be deleted from the server computer and/or stored separately. If the server computer is breached and the bloom filters are obtained, a hacker is unable to decrypt any credentials from the bloom filters.

A hacker may use the bloom filters to launch a dictionary attack (i.e. check many usernames and passwords). However, for each credential the hacker would need to compute the cryptographic hash and encryption, and then test the bloom filter, which would be inefficient for testing a large amount of credentials. Furthermore, the presence of false positives, as discussed above, would lead to false credential hits. For example, if a hacker were testing a combination of 1 billion usernames and 1 billion passwords ($10^{18}$ total), a false positive rate of $10^{-8}$ would result in 10 billion false hits. Additionally, fake credentials may be added to the bloom filters to mitigate attacks, which also avoids sparse bloom filters caused by uneven credential hash distributions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method implemented by a network traffic management system comprising one or more network traffic apparatuses, client devices, or server devices:
   receiving, as digital input, a credential comprising a username and a password;
   determining an index value that is associated with the credential, and sending the index value to a server;
   receiving a set of digital data comprising a bloom filter corresponding to the index value;
   generating a first value based on the credential, and sending the first value to the server;
   receiving a second value generated based on the first value;
   determining, based on the second value, when the credential corresponds to an entry in the bloom filter; and
   determining when the credential is likely to have been compromised based on when the credential corresponds to an entry in the bloom filter.

2. The method of claim 1 wherein determining the index value associated with the credential comprises applying a lossy hash function to the username.

3. The method of claim 1 further comprising:
   generating a secret key;
   wherein generating the first value is further based on the secret key; and
   wherein determining when the credential corresponds to the bloom filter comprises removing the secret key from the second value to generate a third value, and determining when the third value is in the bloom filter.

4. The method of claim 3 further comprising:
   receiving a public key corresponding to the index value; and
   encrypting the secret key using the public key, wherein generating the first value is based on the encrypted secret key.

5. The method of claim 1 further comprising:
   receiving a salt value corresponding to the index value; and
   wherein generating the first value is further based on the salt value.

6. The method of claim 1 further comprising:
   in response to determining that the credential corresponds to an entry in the bloom filter, determining that the credential is likely to have been compromised; and
   in response to determining that the credential does not correspond to an entry in the bloom filter, determining that the credential was not compromised.

7. The method of claim 1, wherein the credential is associated with an attempt to access a computer system, the method further comprising:
   in response to determining that the credential is likely to have been compromised based on when the credential corresponds to an entry in the bloom filter, blocking access to the computer system; and in response to determining that the credential is not likely to have been compromised based on when the credential corresponds to an entry in the bloom filter, permitting access to the computer system.

8. A non-transitory computer readable medium having stored thereon instructions comprising executable code which when executed by one or more processors, causes the processors to:
receive, as digital input, a credential comprising a username and a password;
determine an index value that is associated with the credential, and sending the index value to a server;
receive, a set of digital data comprising a bloom filter corresponding to the index value;
generate a first value based on the credential, and sending the first value to the server;
receive a second value generated based on the first value;
determine, based on the second value, when the credential corresponds to an entry in the bloom filter; and
determine when the credential is likely to have been compromised based on when the credential corresponds to an entry in the bloom filter.

9. The medium of claim 8 wherein determining the index value associated with the credential comprises applying a lossy hash function to the username.

10. The medium of claim 8 further comprising:
generating a secret key;
wherein generating the first value is further based on the secret key; and
wherein determining when the credential corresponds to the bloom filter comprises removing the secret key from the second value to generate a third value, and determining when the third value is in the bloom filter.

11. The medium of claim 10 further comprising:
receiving a public key corresponding to the index value; and
encrypting the secret key using the public key, wherein generating the first value is based on the encrypted secret key.

12. The medium of claim 8 further comprising:
receiving a salt value corresponding to the index value; and
wherein generating the first value is further based on the salt value.

13. The medium of claim 8 further comprising:
in response to determining that the credential corresponds to an entry in the bloom filter, determining that the credential is likely to have been compromised; and
in response to determining that the credential does not correspond to an entry in the bloom filter, determining that the credential was not compromised.

14. The medium of claim 8, further comprises:
wherein the credential is associated with an attempt to access a computer system;
in response to determining that the credential is likely to have been compromised based on when the credential corresponds to an entry in the bloom filter, blocking access to the computer system; and
in response to determining that the credential is not likely to have been compromised based on when the credential corresponds to an entry in the bloom filter, permitting access to the computer system.

15. A network traffic manager apparatus, comprising memory comprising programmed instructions stored in the memory and one or more processors configured to be capable of executing the programmed instructions stored in the memory to:
receive, as digital input, a credential comprising a username and a password;
determine an index value that is associated with the credential, and sending the index value to a server;
receive a set of digital data comprising a bloom filter corresponding to the index value;
generate a first value based on the credential, and sending the first value to the server;
receive a second value generated based on the first value;
determine, based on the second value, when the credential corresponds to an entry in the bloom filter; and
determine when the credential is likely to have been compromised based on when the credential corresponds to an entry in the bloom filter.

16. The apparatus as set forth in claim 15 wherein determining the index value associated with the credential comprises applying a lossy hash function to the username.

17. The apparatus as set forth in claim 15 wherein the one or more processors are further configured to be capable of executing the programmed instructions stored in the memory to:
generate a secret key;
wherein generating the first value is further based on the secret key; and
wherein determining when the credential corresponds to the bloom filter comprises removing the secret key from the second value to generate a third value, and determining when the third value is in the bloom filter.

18. The apparatus as set forth in claim 17 wherein the one or more processors are further configured to be capable of executing the programmed instructions stored in the memory to:
receive a public key corresponding to the index value; and
encrypt the secret key using the public key, wherein generating the first value is based on the encrypted secret key.

19. The apparatus as set forth in claim 15 wherein the one or more processors are further configured to be capable of executing the programmed instructions stored in the memory to:
receive a salt value corresponding to the index value; and
wherein generating the first value is further based on the salt value.

20. The apparatus as set forth in claim 15 wherein the one or more processors are further configured to be capable of executing the programmed instructions stored in the memory to:
in response to determining that the credential corresponds to an entry in the bloom filter, determining that the credential is likely to have been compromised; and
in response to determining that the credential does not correspond to an entry in the bloom filter, determining that the credential was not compromised.

21. The apparatus as set forth in claim 15 wherein the one or more processors are further configured to be capable of executing the programmed instructions stored in the memory to:
wherein the credential is associated with an attempt to access a computer system;
in response to determining that the credential is likely to have been compromised based on when the credential corresponds to an entry in the bloom filter, blocking access to the computer system; and
in response to determining that the credential is not likely to have been compromised based on when the credential corresponds to an entry in the bloom filter, permitting access to the computer system.

22. A network traffic management system, comprising one or more traffic management apparatuses, client devices, or server devices, the network traffic management system comprising memory comprising programmed instructions stored thereon and one or more processors configured to be capable of executing the stored programmed instructions to:
- receive, as digital input, a credential comprising a username and a password;
- determine an index value that is associated with the credential, and sending the index value to a server;
- receive a set of digital data comprising a bloom filter corresponding to the index value;
- generate a first value based on the credential, and sending the first value to the server;
- receive a second value generated based on the first value;
- determine, based on the second value, when the credential corresponds to an entry in the bloom filter; and
- determine when the credential is likely to have been compromised based on when the credential corresponds to an entry in the bloom filter.

23. The network traffic management system of claim 22 wherein determining the index value associated with the credential comprises applying a lossy hash function to the username.

24. The network traffic management system of claim 22, wherein the one or more processors are further configured to be capable of executing the programmed instructions stored in the memory to:
- generate a secret key;
- wherein generating the first value is further based on the secret key; and
- wherein determining when the credential corresponds to the bloom filter comprises removing the secret key from the second value to generate a third value, and determining when the third value is in the bloom filter.

25. The network traffic management system of claim 24, wherein the one or more processors are further configured to be capable of executing the programmed instructions stored in the memory to:
- receive a public key corresponding to the index value; and
- encrypt the secret key using the public key, wherein generating the first value is based on the encrypted secret key.

26. The network traffic management system of claim 22, wherein the one or more processors are further configured to be capable of executing the programmed instructions stored in the memory to:
- receive a salt value corresponding to the index value; and
- wherein generating the first value is further based on the salt value.

27. The network traffic management system of claim 22, wherein the one or more processors are further configured to be capable of executing the programmed instructions stored in the memory to:
- in response to determining that the credential corresponds to an entry in the bloom filter, determining that the credential is likely to have been compromised; and
- in response to determining that the credential does not correspond to an entry in the bloom filter, determining that the credential was not compromised.

28. The network traffic management system of claim 22, wherein the one or more processors are further configured to be capable of executing the programmed instructions stored in the memory to:
- wherein the credential is associated with an attempt to access a computer system;
- in response to determining that the credential is likely to have been compromised based on when the credential corresponds to an entry in the bloom filter, blocking access to the computer system; and
- in response to determining that the credential is not likely to have been compromised based on when the credential corresponds to an entry in the bloom filter, permitting access to the computer system.

* * * * *